United States Patent
Fujita et al.

(10) Patent No.: US 8,892,309 B2
(45) Date of Patent: Nov. 18, 2014

(54) VEHICLE STEERING CONTROL APPARATUS

(75) Inventors: Yoshitaka Fujita, Susono (JP); Mitsutaka Tanimoto, Susono (JP); Yoshiaki Tsuchiya, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/814,269

(22) PCT Filed: Dec. 20, 2010

(86) PCT No.: PCT/JP2010/072894
§ 371 (c)(1),
(2), (4) Date: Feb. 5, 2013

(87) PCT Pub. No.: WO2012/085997
PCT Pub. Date: Jun. 28, 2012

(65) Prior Publication Data
US 2013/0261898 A1   Oct. 3, 2013

(51) Int. Cl.
*B62D 6/00* (2006.01)
*B62D 7/15* (2006.01)

(52) U.S. Cl.
CPC ............... *B62D 6/003* (2013.01); *B62D 7/159* (2013.01)
USPC ..................... 701/41; 701/42; 701/44; 701/48

(58) Field of Classification Search
CPC ........ B62D 5/00; B62D 5/008; B62D 5/0418; B62D 5/0457; B62D 7/15; B62D 7/1545; B62D 7/159; B62D 6/00; B62D 6/003; B62D 6/006; B62D 6/02
USPC ........... 701/48, 69, 70, 71, 72, 73, 75, 82, 83, 701/90, 91, 41, 42, 44
See application file for complete search history.

(56) References Cited

U.S. PATENT DOCUMENTS

| 4,703,822 A | * | 11/1987 | Kawamoto et al. | ............ 180/412 |
| 4,730,839 A | * | 3/1988 | Miyoshi | ........................ 180/415 |

(Continued)

FOREIGN PATENT DOCUMENTS

| JP | 6-156303 | 6/1994 |
| JP | 10-250547 | 9/1998 |

(Continued)

*Primary Examiner* — Thomas G Black
*Assistant Examiner* — Sara Nelson
(74) *Attorney, Agent, or Firm* — Finnegan, Henderson, Farabow, Garrett & Dunner, LLP

(57) ABSTRACT

A vehicle steering control apparatus is provided with: a first setting device for setting a first target steering angle of rear wheels according to a steering wheel operation of a driver; a second setting device for setting a second target steering angle of the rear wheels which does not work with the steering wheel operation by the driver and which is associated with automatic steering; a controlling device for controlling a steering angle of the rear wheels on the basis of the set first and second target steering angles; and a limiting device for limiting an influence of the first target steering angle on the steering angle of the rear wheels in accordance with a driving condition of the vehicle if the set first and second target steering angles have a mutually anti-phase relation, the limiting device limiting an influence of the second target steering angle on the steering angle of the rear wheels in accordance with the driving condition of the vehicle in preference to the first target steering angle if the automatic steering associated with the setting of the second target steering angle suppresses a change in the vehicle state quantity produced in a process of controlling a state controlled variable which is different front the steering angle of the rear wheels.

6 Claims, 7 Drawing Sheets

(56) References Cited

U.S. PATENT DOCUMENTS

| | | | |
|---|---|---|---|
| 5,189,616 A * | 2/1993 | Tsurumiya et al. | 701/41 |
| 6,968,920 B2 * | 11/2005 | Barton et al. | 180/446 |
| 7,860,623 B2 * | 12/2010 | Bauer et al. | 701/41 |
| 2001/0027893 A1 * | 10/2001 | Nishizaki et al. | 180/409 |
| 2004/0102887 A1 * | 5/2004 | Lin et al. | 701/70 |
| 2004/0133324 A1 * | 7/2004 | Yasui et al. | 701/41 |
| 2005/0205346 A1 * | 9/2005 | Aizawa et al. | 180/446 |
| 2006/0041360 A1 * | 2/2006 | Post, II | 701/48 |
| 2007/0150118 A1 * | 6/2007 | Takamatsu et al. | 701/1 |
| 2009/0319114 A1 * | 12/2009 | Takenaka et al. | 701/29 |
| 2010/0228444 A1 * | 9/2010 | Kojo et al. | 701/42 |
| 2013/0190988 A1 * | 7/2013 | Limpibunterng et al. | 701/42 |

FOREIGN PATENT DOCUMENTS

| | | |
|---|---|---|
| JP | 2001-334950 | 12/2001 |
| JP | 2005-324744 | 11/2005 |
| JP | 2008-100579 | 5/2008 |
| JP | 2008-110708 | 5/2008 |
| JP | 2009-190464 | 8/2009 |

* cited by examiner (a)

(b)

(a)

(b)

VEHICLE STEERING CONTROL APPARATUS

This application is a national phase application of International Application No. PCT/JP2010/072894, filed Dec. 20, 2010, the content of which is incorporated herein by reference.

TECHNICAL FIELD

The present invention relates to a vehicle steering control apparatus for controlling a steering state of a vehicle equipped with various rear wheel steering angle varying apparatuses capable of changing a rear wheel steering angle, such as, for example, an active rear steering (ARS) and an all wheel steering (AWS).

BACKGROUND ART

As this type of apparatus, there has been suggested an apparatus for suppressing control interference between basic control of a controlled object performed by a certain control device and corrective control for correcting the basic control performed by another control device (e.g. refer to a patent document 1).

According to the vehicle control apparatus disclosed in the patent document 1, as the corrective control, there are disclosed understeer control for reducing an outward turning yaw moment or increasing an inward turning yaw moment, and braking μ-split control during braking for canceling out the yaw moment due to a braking force difference between left and right wheels. In cases where the above controls are in operating condition, by stopping the rear wheel steering ratio control as the basic control and setting a rear wheel steering ratio SGr to "0", it is considered to be possible to suppress interference between them and rear wheel steering ratio control.

Incidentally, as interference suppression control in different fields from rear wheel steering, there has been also suggested control for reducing a controlled variable of target control torque when a steering direction of the target control torque and a steering direction of driver steering torque are different from each other and are subject to the control interference.

PRIOR ART DOCUMENT

Patent Document

Patent document 1: Japanese Patent Application Laid Open No. 2008-110708
Patent document 2: Japanese Patent Application Laid Open No. 2009-190464

DISCLOSURE OF INVENTION

Subject to be Solved by the Invention

In the plurality of controls associated with the steering of rear wheels, priority in terms of control between the plurality of controls is not always uniform. Therefore, if one control is always prioritized over the other control, vehicle behavior is not always optimized on a practical operation side. In other words, there is room for improvement in optimizing the vehicle behavior in the apparatus disclosed in the patent document 1 in which the control of the rear wheel steering ratio (hereinafter expressed as "control in a normal region" as occasion demands) as the basic control, which falls into normal steering wheel control, is always a controlled object.

In fact, in a vehicle configuration in which various behavior stabilization controls for stabilizing the vehicle behavior are performed by maintaining lateral acceleration, a vehicle body slip angle, a yaw rate, a yaw moment, or the like at a desired target value, if the control of the rear wheel steering ratio in the normal region interferes with this type of behavior stabilization control, then, the control of the rear wheel steering ratio is to be limited in many cases from the viewpoint of avoiding unstable vehicle behavior.

However, there is, of course, a technical meaning in the control of the rear wheel steering ratio in the normal region, and it should be considered that there is no reasonable reason to consistently limit the rear wheel steering ratio control in the normal region, for example, in cases where the vehicle behavior to be stably maintained by the rear wheel steering can be stabilized in another method and in cases where the vehicle behavior unstable enough to need to make the rear wheel steering actively intervene can be suppressed before or immediately after the occurrence of the unstabilization.

Moreover, in the apparatus disclosed in the patent document 1, the control of the rear wheel steering ratio is practically invalidated upon the occurrence of the control interference as described above, and a driver's intention is thus always ignored upon the occurrence of the control interference. In such a binary control form, the vehicle behavior is not always desirable even in a situation in which automatic steering is prioritized in cases where priority is to be put on the automatic steering.

In view of the aforementioned circumstances, it is therefore an object of the present invention to provide a vehicle steering control apparatus capable of always maintaining optimal vehicle behavior in cases where the plurality of controls associated with the rear wheel steering interfere with each other.

DISCLOSURE OF INVENTION

Subject to be Solved by the Invention

The above object of the present invention can be achieved by a vehicle steering control apparatus for controlling a vehicle, the vehicle comprising a rear wheel steering angle varying apparatus capable of changing a steering angle of rear wheels, said vehicle steering control apparatus comprising: a first setting device for setting a target steering angle of the rear wheels according to a steering wheel operation of a driver, as a first target steering angle; a second setting device for setting a target steering angle of the rear wheels which does not work with the steering wheel operation by the driver and which is associated with automatic steering accompanied by control of a vehicle state quantity for a target value, as a second target steering angle; a controlling device for controlling a steering angle of the rear wheels on the basis of the set first and second target steering angles; and a limiting device for limiting an influence of the first target steering angle on the steering angle of the rear wheels in accordance with a driving condition of the vehicle if the set first and second target steering angles have a mutually anti-phase relation, said limiting device limiting an influence of the second target steering angle on the steering angle of the rear wheels in accordance with the driving condition of the vehicle in preference to the first target steering angle if the automatic steering suppresses a change in the vehicle state quantity produced in a process of controlling a state controlled variable of the vehicle which is different from the steering angle of the rear wheels.

The vehicle of the present invention is provided with the rear wheel steering angle varying apparatus. The rear wheel steering angle varying apparatus conceptually includes an apparatus capable of changing at least the rear wheels independently of the steering wheel operation, such as, for example, ARS and AWS. Incidentally, the expression of "capable of changing . . . independently of the steering wheel operation" does not exclude steering angle control of the rear wheels which works with the steering wheel operation (which may be steering angle control via a steering mechanism which is mechanically coupled with a steering wheel, or steering angle control via the steering mechanism which is not mechanically coupled with the steering wheel).

Incidentally, as a preferred form, the vehicle of the present invention may be equipped with an apparatus for changing a steering angle of front wheels independently of the steering wheel operation, such as Variable Gear Ratio Steering (VGRS). Moreover, the aforementioned AWS may be a four-wheel steering apparatus established by a combination of the ARS and the VGRS.

The vehicle steering control apparatus of the present invention is an apparatus for controlling such a vehicle, and it can adopt forms of, for example, various computer systems or the like, such as microcomputer apparatuses, various controllers, or various processing units like a single or a plurality of electronic control units (ECUs), which can include, as occasion demands, one or a plurality of central processing units (CPUs), micro processing units (MPUs), various processors or various controllers, or moreover, various storage devices or the like, such as a read only memory (ROM), a random access memory (RAM), a buffer memory or a flash memory.

According to the vehicle steering control apparatus of the present invention, the first target steering angle is set by the first setting device.

The first target steering angle is the target steering angle of the rear wheels according to the steering wheel operation by the driver based on the driver's steering intention, and it is the target steering angle of the rear wheels in the normal region. The first target steering angle is set, as occasion demands, by being calculated in accordance with, for example, a vehicle speed, a steering wheel angle (which is a rotation angle of the steering wheel and is equivalent with a so-called "steering angle"), and a steering wheel angular velocity which is a time differential value of the steering wheel angle, or by selecting an appropriate value from a control map in which they are stored in a proper storage device in advance as parameters, or in similar manners.

On the other hand, according to the vehicle steering control apparatus of the present invention, separately from the first target steering angle, the second target steering angle is set by the second setting device.

The second target steering angle is the target steering angle of the rear wheels for realizing the automatic steering. Here, the "automatic steering" means automatic steering control which is accompanied by control of the vehicle state quantity for a target value and which does not work with the steering wheel operation by the driver, and it preferably includes, in effect, various behavior stabilization controls such as, for example, Vehicle Stability Control (VSC) or μ-split braking control aimed at stabilizing the vehicle behavior, and various trajectory following controls or the like, such as, for example, Lane Keeping Assist (LKA) for driving the vehicle along a target driving route. Of course, the automatic steering performed in the vehicle is not necessarily single, and a plurality of automatic steering may be performed cooperatively or alternatively in accordance with various execution conditions or control conditions.

Incidentally, the "vehicle state quantity" is various physical quantities, controlled variables, or index values for quantitatively defining a state of motion of the vehicle, and it is a value that can be controlled indirectly by various state controlled variables to which controllability is given via various motion control devices including the rear wheel steering angle varying apparatus (which means, so to speak, a direct controlled object). Considering that the state controlled variable to which the controllability is given by the rear wheel steering angle varying apparatus is the rear wheel steering angle, the vehicle state quantity of the present invention is a value related to turning behavior of the vehicle, and it can include, for example, a yaw rate, a yaw moment, a vehicle body slip angle, a yaw angle deviation with respect to the target driving route, lateral acceleration, and values similar thereto.

The second target steering angle may be, for example, the target steering angle of the rear wheels for generating a yaw moment in a direction opposite to that of an unintended yaw moment which occurs for some reasons upon going straight or turning, or may be the target steering angle of the rear wheels for correcting understeer (a phenomenon in which the vehicle turns on a driving route which is the outside of the target driving route) or oversteer (a phenomenon in which the vehicle turns on a driving route which is the inside of the target driving route), which occurs for some reasons upon vehicle turning, to neutral steer, weak understeer, or weak oversteer. Alternatively, it may be the target steering angle of the rear wheels for maintaining a lateral position deviation and a yaw angle deviation or the like between the vehicle and various target objects, such as a lane and a lane mark for defining the target driving route, in a predetermined range.

The controlling device controls the steering angle of the rear wheels on the basis of the set first and second target steering angles in a situation in which the first and second target steering angles are set (of course, there can be cases where only one of them is set, depending on the driving condition of the vehicle).

At this time, the controlling device may set a final target steering angle of the rear wheels by simply adding the first target steering angle and the second target steering angle (where positive and negative signs given in accordance with a steering direction need to be considered), or may add correction processing, as occasion demands, to the target steering angles after the addition processing or to at least one of the target steering angles before the addition processing. The final target steering angle is preferably converted to the controlled variable of the rear wheel steering angle varying apparatus (a control current value, a control voltage value, a control time value, a control rotation angle, or the like), by which the rear wheel steering angle varying apparatus is controlled.

Here, the second target steering angle is the target steering angle set independently of the steering wheel operation by the driver, and thus, in some case, the control direction thereof has an anti-phase relation with that of the first target steering angle according to the steering wheel operation by the driver, depending on the vehicle state quantity which is defined on the basis of a control standard of the automatic steering and which should be adopted by the vehicle at that time point, and the steering angle control of the rear wheels according to the steering wheel operation and the steering angle control of the rear wheels in the automatic steering interfere with each others.

In particular, if the first target steering angle and the second target steering angle cancel out each other and the final target steering angle of the rear wheels is zero or a value corresponding to zero, then, both the steering angle control of the rear wheels according to the steering wheel operation and the steering angle control of the rear wheels in the automatic steering are practically in a revocation state, and the vehicle behavior tends to be unstable. Therefore, if such control interference occurs, there arises a need to limit the influence of the first target steering angle or the second target steering angle on the final steering angle of the rear wheels.

At this time, considering that the automatic steering is control for promoting convergence or asymptotic approach to the target value of the vehicle state quantity and that a termination condition of the automatic steering control can be defined clearly in each of the automatic steering controls of a type that it is allowed to end on the basis of the driver's clear termination intention, if the driver's steering according to the first target steering angle and the automatic steering according to the second target steering angle interfere with each other, i.e. if it does not fall under the condition to stop the automatic steering, it is reasonable to think that the automatic steering is not to be limited even though the first target steering angle reflects the driver's steering intention. In particular, this shall apply more if the automatic steering is to stabilize the vehicle behavior (e.g. μ-split braking control, VSC, or the like).

Thus, in the vehicle steering control apparatus of the present invention, if the set first and second target steering angles have the mutually anti-phase relation, the influence of the first target steering angle on the steering angle of the rear wheels is limited by the limiting device.

Incidentally, the term "limit" means to reduce the degree of contribution to some extent and also includes in effect no reflection (i.e. means 100% limitation). The limiting device limits the influence of the first target steering angle in a multistage or continuous manner in accordance with the driving condition of the vehicle as a condition capable of giving a significant influence to a relation between the vehicle behavior and a steering angle change of the rear wheels, such as, for example, a vehicle speed, a steering angle or a steering angular velocity.

When the control interference occurs, if there is only a choice to invalidate the first target steering angle according to the steering wheel operation by the driver, then, the driver tends to have an uncomfortable feeling, uneasy feeling, or unpleasant feeling due to no reflection of the driver's own steering wheel operation in the vehicle behavior. For example, considering that an influence of the rear wheel steering angle on the vehicle behavior can change in accordance with the driving condition of the vehicle, there can be cases where it is almost not necessary to limit the first target steering angle. If 100% limitation is performed in the cases, the degree of the limitation deviates from a practically required value, and it becomes difficult to realize the desired vehicle behavior even though the automatic steering is prioritized under the determination that the automatic steering is to be prioritized.

In that respect, according to the configuration of the present invention that the first target steering angle is limited in the multi-stage or continuous manner in accordance with the driving condition of the vehicle as describe above, the appropriate limitation according to the driving condition of the vehicle at that time point can be performed, and the steering wheel operation by the driver can be thus reflected in the rear wheel steering angle accurately all the time, which is extremely useful in practice.

By the way, in cases where the first target steering angle and the second target steering angle have the anti-phase relation, basically, the preferential limitation of the first target steering angle according to the steering wheel operation as described above can be a reasonable measure; however, it is not necessarily reasonable that the first target steering angle is limited in preference to the second target steering angle all the time because the first target steering angle according to the steering wheel operation has, of course, a practical meaning.

Thus, the limiting device of the present invention judges whether or not the limitation of the second target steering angle prioritized over the first target steering angle can be performed in accordance with a control rule as described below and limits the second target steering angle in preference to the first target steering angle if the limitation of the second target steering angle can be prioritized. More specifically, the limiting device limits the influence of the second target steering angle in preference to the first target steering angle if the automatic steering suppresses the change in the vehicle state quantity produced in the process of controlling the state controlled variable of the vehicle which is different from the rear wheel steering angle.

Here, the "state controlled variable which is different from the rear wheel steering angle" means, for example, a braking/driving force (which means at least one of a braking force and a driving force) applied to each wheel or the like, as a preferred form. In the process of controlling the braking/driving force of each wheel, for example, an unintended yaw moment occurs in the vehicle in some cases due to a braking/driving force difference of left and right wheels or the like. Due to the yaw moment, the vehicle turns to the side that the braking force is relatively large or that the driving force is relatively small.

Here, in particular, if the automatic steering associated with the setting of the second target steering angle suppresses, for example, this type of moment (i.e. the change in the vehicle state quantity which occurs in the process of controlling another state controlled variable), so to speak, if there is the state controlled variable which has a mutually complementary relation with the rear wheel steering angle in performing the automatic steering, it is possible to reasonably reduce a set value of the second target steering angle associated with the automatic steering by reducing or suppressing another state controlled variables (in this example, a left-right braking/driving force difference) which correspond to the second target steering angle in a one-to-one, one-to-many, many-to-one, or many-to-many manner.

In other words, in the vehicle steering control apparatus of the present invention, taking into account the point that there are cases where the second target steering angle which interferes with the first target steering angle can be reasonably limited depending on the type of the automatic steering, it is possible to reflect the steering wheel operation by the driver in the vehicle behavior as much as possible while suppressing the deterioration of the vehicle behavior as much as possible in cases where the control interference occurs between the automatic steering and the steering by the driver, due to such a technical idea that the second target steering angle is limited in preference to the first target steering angle in the above cases.

Incidentally, in limiting the second target steering angle in preference to the first target steering angle, the limiting device limits the second target steering angle in accordance with the driving condition of the vehicle in the same manner as the case of the first target steering angle. The driving condition of the vehicle in this case does not necessarily match that in the case of the first target steering angle. In any case, it is possible to limit the second target steering angle to an accurate degree all the time in view of the driving condition.

In one aspect of the vehicle steering control apparatus of the present invention, said limiting device limits the influence of the first or second target steering angle on the steering angle of the rear wheels by correcting the set first or second target steering angle to a reduction side in accordance with at least one of a value corresponding to a steering input by the driver and a vehicle speed as the driving condition (claim 2).

According to this aspect, one of the target steering angles to be limited is limited by correcting the one target steering angle to be limited to the reduction side in accordance with at least one of the value corresponding to the steering input by the driver and the vehicle speed as the driving condition for remarkably defining the degree of the influence of the rear wheel steering angle on the vehicle behavior. Thus, it is possible to keep the degree of the limitation of the one target steering angle to a minimum or in an appropriate range, and it is possible to preferably realize the coexistence of the steering according to the steering wheel operation and the automatic steering without causing the unstable vehicle behavior.

Incidentally, the "value corresponding to the steering input" of the present invention conceptually includes a state quantity, a controlled variable, or an index value for defining the degree of the steering wheel operation (also referred to as driver steering) by the driver, and it means, as a preferred form, for example, a steering input quantity (e.g. a steering wheel angle (steering angle)), a steering input speed (e.g. a steering wheel angular velocity (steering angular velocity)), or the like.

Moreover, when the first target steering angle according to the steering wheel operation is limited, the steering input quantity may be adopted as the value corresponding to the steering input. When the second target steering angle according to the automatic steering is limited, the steering input quantity, the steering input speed, or the like may be adopted as the value corresponding to the steering input.

In another aspect of the vehicle steering control apparatus of the present invention, the vehicle comprises a braking force varying apparatus capable of changing a braking force applied to each of wheels including the rear wheels as the state controlled variable, said second setting device sets the second target steering angle such that a yaw moment of the vehicle as the vehicle state quantity which changes to be high or low in accordance with a large or small left-right braking force difference of the wheels, respectively, is canceled out by a yaw moment of the vehicle which changes to be high and low in accordance with the large or small steering angle of the vehicle, respectively, and said limiting device limits the influence of the second target steering angle on the steering angle of the rear wheels by correcting the set second target steering angle to a reduction side in accordance with at least one of a value corresponding to a steering input by the driver and a vehicle speed as the driving condition and by controlling the left-right braking force difference via the braking force varying apparatus so as to suppress a change in the yaw moment of the vehicle due to the correction to the reduction side of the set second target steering angle (claim 3).

According to this aspect, as the automatic steering performed in the vehicle, at least the control of the yaw moment (i.e. the vehicle state quantity) according to the steering angle (i.e. the state controlled variable) of the wheels including the rear wheels is included, and the second target steering angle is set such that the yaw moment generated in accordance with the left-right braking force difference of the left and right wheels (which may be only the front wheels, only the rear wheels, or all the wheels) and the yaw moment generated in accordance with the steering angle of the wheels including at least the rear wheel steering angle are canceled out regardless of the magnitude of the degree. In other words, in this case, the rear wheel steering angle and the left-right braking force difference, which are both the state control quantity, have a mutually complementary relation.

In such a configuration, even if the second target steering angle is limited by being corrected to the reduction side with respect to an original set value, the effect of the automatic steering can be practically maintained by changing the left-right braking force difference, which increases or decreases correspondingly to the second target steering angle in a one-to-one, one-to-many, many-to-one, or many-to-many manner, in a direction of reducing the set second target steering angle.

According to this aspect, the limiting device limits the second target steering angle if the interference occurs between the target steering angles, and the limiting device reduces the left-right braking force difference in association with the limitation. Therefore, it is possible to maintain the steering angle control in the normal region according to the steering wheel operation by the driver while preventing the limitation of the second target steering angle from influencing the control of the vehicle behavior associated with the automatic steering.

In another aspect of the vehicle steering control apparatus of the present invention, the vehicle comprises a braking force varying apparatus capable of changing a braking force applied to each of wheels including the rear wheels as the state controlled variable, said second setting device sets the second target steering angle such that a yaw moment of the vehicle as the vehicle state quantity which changes to be high or low in accordance with a large or small left-right braking force difference of the wheels, respectively, is canceled out by a yaw moment of the vehicle which changes to be high and low in accordance with the large or small steering angle of the vehicle, respectively, and said limiting device limits the influence of the second target steering angle on the steering angle of the rear wheels by controlling the left-right braking force difference in accordance with at least one of a value corresponding to a steering input by the driver and a vehicle speed as the driving condition via the braking force varying apparatus (claim 4).

According to this aspect, as in the aforementioned aspect, if the automatic steering associated with the setting of the second target steering angle, which interferes with the first target steering angle, is the control of the yaw moment, the left-right braking force difference is reduced before the second target steering angle. If the left-right braking force difference is reduced, then, the yaw moment is suppressed which influences the setting of the second target steering angle associated with the automatic steering. Thus, the second target steering angle set by the second setting device is also reduced, and as a necessity, the influence of the second target steering angle on the rear wheel steering angle is limited.

In other words, according to this aspect, it is possible to suppress the magnitude of the interference between the first target steering angle and the second target steering angle by intervening in the process of setting the second target steering angle. Therefore, it is extremely useful in practice.

In one aspect of the vehicle steering control apparatus of the present invention in the case that the automatic steering is performed for canceling out the change of the yaw moment which is generated by the left-right braking force difference of the wheels, the left-right braking force difference of the wheels is a left-right braking force difference caused by a difference in a friction coefficient if the braking force is applied to the each wheel in cases where the vehicle drives on a road surface with mutually different friction coefficients (claim 5).

According to this aspect, the automatic steering as the control of the yaw moment caused by the left-right braking force difference is one aspect of the so-called "µ-split braking control". In other words, in cases where the vehicle drives on the road surface with the mutually different friction coefficients, even if the same braking pressure is applied to the left and right wheels, the braking force acting between the wheel and the road surface becomes large on the side that the friction coefficient is relatively high, and the yaw moment is generated in a direction of turning to the road surface side that the friction coefficient is relatively high, and the vehicle turns. In the µ-split braking control, this yaw moment is canceled out by a yaw moment intentionally generated by the steering angle change of the wheels including the rear wheels.

This type of µ-split braking control can be replaced by the control of steering torque such as EPS; however, the steering angle change can change the vehicle behavior more directly than the steering torque can, and it is thus preferable as the state controlled variable associated with the µ-split braking control having a meaning of so-called one type of emergency avoidance measure which requires promptness.

In another aspect of the vehicle steering control apparatus of the present invention in the case that the automatic steering is performed for canceling out the change of the yaw moment which is generated by the left-right braking force difference of the wheels, said limiting device reduces a correction amount to the reduction side of a left-right braking/driving force difference of the rear wheels or the set second target steering angle, with increasing elapsed time from start of the application of the braking force (claim 6).

When the left-right braking force difference is reduced regardless of actively or passively, it is reasonable to make the relatively high braking force approach the relatively low braking force. Particularly, in the µ-split braking control, since the braking force difference is not intentionally given, it is practically hard to take a measure other than such a measure (a measure in which the braking force acting the wheel which is in contact with the road surface on the relatively high friction side is corrected to the reduction side). However, if the left-right braking force difference is reduced by reducing one of the braking forces as described above, there is a possibility that the braking force according to a braking demand cannot be always obtained sufficiently.

For such a problem, according to this aspect, the correction amount to the reduction side of the second target steering angle is reduced in accordance with the elapsed time from the start of the application of the braking force. In other words, as time passes from the start of the braking, the braking force approaches the normal braking force according to the braking demand. Therefore, on the whole, the braking force increases as time passes from the start of the braking, and the deceleration of the vehicle is ensured sufficiently. Thus, the vehicle behavior can be maintained, more stably.

The operation and other advantages of the present invention will become more apparent from an embodiment explained below.

MODE FOR CARRYING OUT THE INVENTION

<Embodiment of the Invention>

Hereinafter, an embodiment of the control apparatus of the vehicle of the present invention will be explained with reference to the drawings as occasion demands.

<1. Configuration of Embodiment>

Figure 1:
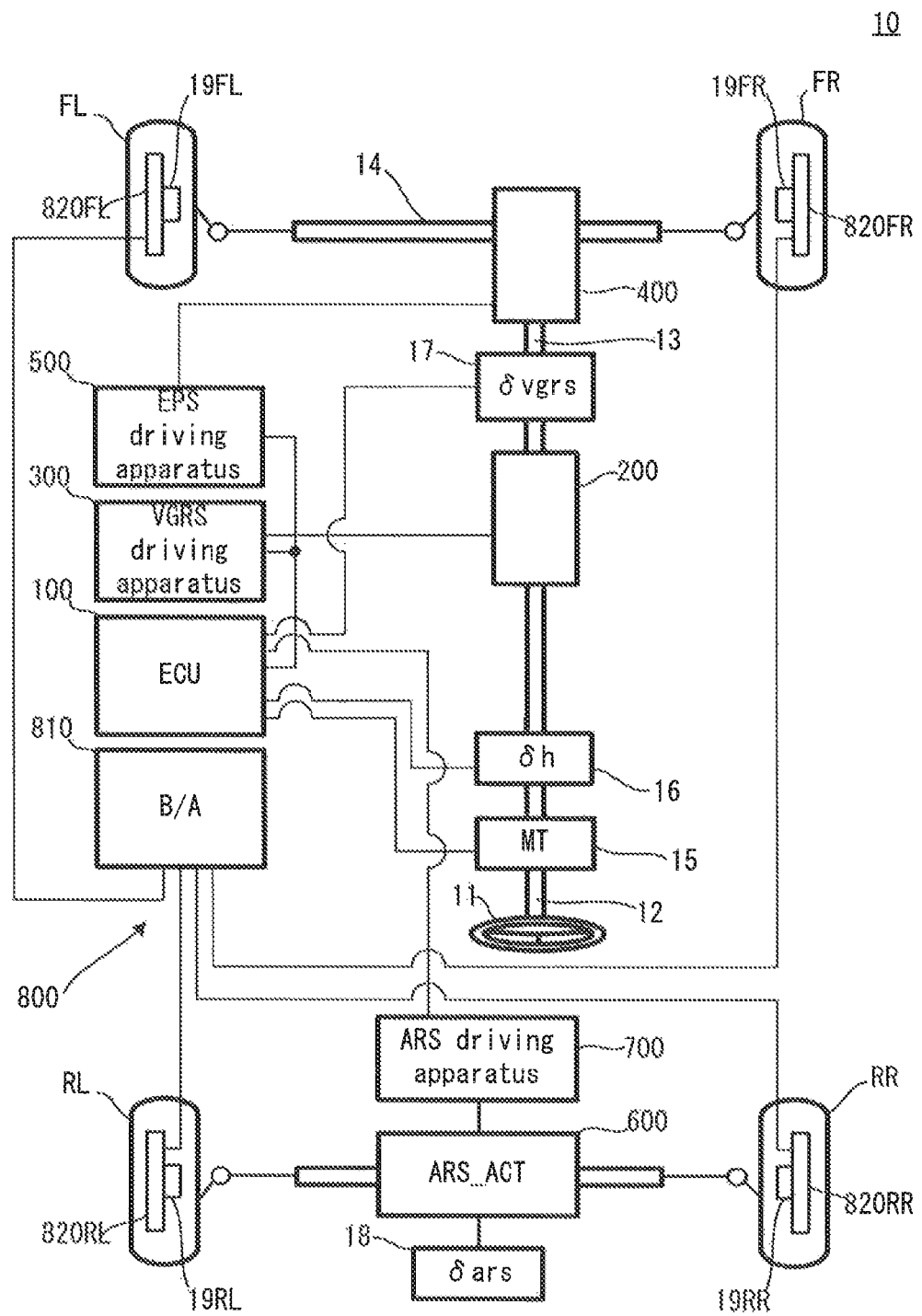
FIG. 1 is a schematic configuration diagram conceptually showing a configuration of a vehicle in an embodiment of the present invention.

Firstly, with reference to FIG. 1, the configuration of a vehicle 10 in a first embodiment of the present invention will be explained. FIG. 1 is a schematic configuration diagram conceptually showing the configuration of a steering system in the vehicle 10.

In FIG. 1, the vehicle 10 is provided with a left and right pair of front wheels FL and FR and a left and right pair of rear wheels RL and RR as steered wheels, and each of the steered wheels is steered in a horizontal direction, by which the vehicle 10 can move in a desired direction. The vehicle 10 is provided with: an ECU 100; a VGRS actuator 200; a VGRS driving apparatus 300; an EPS actuator 400; an EPS driving apparatus 500; an ARS actuator 600; an ARS driving apparatus 700; and an electronic controlled braking system ECB 800.

The ECU 100 is provided with a central processing unit (CPU), a read only memory (ROM), and a random access memory (RAM), each of which is not illustrated, and it is an electronic control unit capable of controlling the entire operation of the vehicle 10. The ECU 100 is one example of the "vehicle steering control apparatus" of the present invention. The ECU 100 is configured to perform rear wheel steering interference compensation control described later, in accordance with a control program stored in the ROM.

Incidentally, the ECU 100 is an integrated electronic control unit configured to function as one example of each of the "first setting device", the "second setting device", the "controlling device", and the "limiting device" of the present invention, and the operation of each of the devices is performed by the ECU 100. However, the physical, mechanical, and electrical configurations of each of the devices of the present invention are not limited to this example, and for example, each of the devices may be configured as various computer systems or the like such as a plurality of ECUs, various processing units, various controllers, or microcomputer apparatuses.

In the vehicle 10, a steering input given from a driver via a steering wheel 11 as the steering input device is transmitted to an upper steering shaft 12 as a shaft body which is coaxially rotatably coupled with the steering wheel 11 and which can rotate in the same direction as that of the steering wheel 11.

The upper steering shaft 12 is coupled with the VGRS actuator 200 at its end on the downstream side thereof.

The VGRS actuator 200 is a steering transmission ratio varying apparatus provided with a housing, a VGRS motor, and a speed reduction mechanism.

The housing is a case or enclosure of the VGRS actuator 200 for accommodating the VGRS motor and the speed reduction mechanism. To the housing, the upper steering shaft 12 described above is fixed at the end on the downstream side. The housing can rotate integrally with the upper steering shaft.

The VGRS motor is a DC brushless motor having a rotor as a rotator, a stator as a stationary part, and a rotating shaft as a shaft for outputting a driving force. The stator is fixed to the inside of the housing, and the rotor is rotatably held in the inside of the housing. The rotating shaft is coaxially rotatably fixed to the rotor and is coupled with the speed reduction mechanism at its end on the downstream side thereof.

The speed reduction mechanism is a planetary gear mechanism having a plurality of rotational elements which can perform differential rotation (a sun gear, a carrier, and a ring gear). Out of the plurality of rotational elements, the sun gear which is a first rotational element is coupled with the rotating shaft of the VGRS motor, and the carrier which is a second rotational element is coupled with the housing. Moreover, the ring gear which is a third rotational element is coupled with a lower steering shaft 13.

According to the speed reduction mechanism having such a configuration, a rotational speed of the upper steering shaft 12 according to the operation amount of the steering wheel 11 (i.e. a rotational speed of the housing coupled with the carrier) and a rotational speed of the VGRS motor (i.e. a rotational speed of the rotating shaft coupled with the sun gear) uniquely determine a rotational speed of the lower steering shaft 13 coupled with the ring gear which is the remaining one rotational element. At this time, it is possible to control an increase and a reduction in the rotational speed of the lower steering shaft 13 by controlling an increase and a reduction in the rotational speed of the VGRS motor by means of the differential action between the rotational elements. In other words, the upper steering shaft 12 and the lower steering shaft 13 can relatively rotate by the action of the VGRS motor and the speed reduction mechanism. Moreover, in terms of the configuration of each rotational element in the speed reduction mechanism, the rotational speed of the VGRS motor is transmitted to the lower steering shaft 13 in the state that it is reduced in accordance with a predetermined speed reduction ratio determined in accordance with a gear ratio between the rotational elements.

As described above, in the vehicle 10, since the upper steering shaft 12 and the lower steering shaft 13 can relatively rotate, a steering transmission ratio K is continuously variable in a range set in advance, wherein the steering transmission ratio is a ratio between a steering wheel angle δh as a rotation angle of the upper steering shaft 12 and a front wheel steering angle δf which is uniquely determined according to the rotation amount of the lower steering shaft 13 (which is also related to a gear ratio of a rack and pinion mechanism described later).

In other words, the VRGS actuator 200 can change a relation between the steering wheel angle δh and the front wheel steering angle δf and can change the front wheel steering angle δf independently of the steering input by the driver.

Incidentally, the speed reduction mechanism may have not only the planetary gear mechanism exemplified here but also another aspect (e.g. an aspect in which the upper steering shaft 12 and the lower steering shaft 13 are relatively rotated by coupling gears, each of which has the different number of teeth, with the upper steering shaft 12 and the lower steering shaft 13, by providing a flexible gear which is in contact with each gear in one portion, and by rotating the flexible gear due to motor torque transmitted via a wave generator, or similar aspects). Alternatively, the speed reduction mechanism may have a physical, mechanical, or mechanistic aspect different from the aforementioned aspect even in the case of the planetary gear mechanism.

The VGRS driving apparatus 300 is an electric drive circuit which includes a PWM circuit, a transistor circuit, an inverter and the like and which can electrify the stator 202b of the VGRS motor 202. The VGRS driving apparatus 300 is electrically connected to a not-illustrated battery, and it can supply a drive voltage to the VGRS motor 202 by using electric power supplied from the battery. Moreover, the VGRS driving apparatus 300 is electrically connected to the ECU 100, and its operation is controlled by the ECU 100.

The rotation of the lower steering shaft 13 is transmitted to a steering mechanism 14.

The steering mechanism 14 is a so-called rack and pinion mechanism and is a mechanism including a pinion gear connected to the lower steering shaft 13 at the end on the downstream side and a rack bar in which gear teeth engaging with the gear teeth of the pinion gear are formed. In the steering mechanism 14, the rotation of the pinion gear is converted into a motion in a horizontal direction in FIG. 1 of the rack bar, by which a steering force is transmitted to each steered wheel via a tie rod and a knuckle (whose reference numerals are omitted) coupled with both ends of the rack bar.

The EPS actuator 400 is a steering torque assisting apparatus provided with an EPS motor as a DC brushless motor including: a not-illustrated rotor as a rotator to which a permanent magnet is attached; and a stator as a stationary part which surrounds the rotor. The EPS motor can generate assist torque TA in a direction of rotation of the rotor, which is rotated by the action of a rotating magnetic field formed in the EPS motor due to the electrification to the stator via the EPS driving apparatus 500.

On the other hand, a not-illustrated reduction gear is fixed to a motor shaft as a rotating shaft of the EPS motor, and this reduction gear engages with the pinion gear. Thus, the assist torque TA generated from the EPS motor functions as assist torque for assisting the rotation of the pinion gear. The pinion gear is coupled with the lower steering shaft 13 as described above, and the lower steering shaft 13 is coupled with the upper steering shaft 12 via the VGRS actuator 200. Therefore, steering torque MT applied to the upper steering shaft 12 is transmitted to the rack bar in a form of being assisted by the assist torque TA, as occasion demands, and the driver's steering load is thus reduced.

The EPS driving apparatus 500 is an electric drive circuit which includes a PWM circuit, a transistor circuit, an inverter and the like and which can electrify the stator of the EPS motor. The EPS driving apparatus 500 is electrically connected to a not-illustrated battery, and it can supply a drive voltage to the EPS motor by using electric power supplied from the battery. Moreover, the EPS driving apparatus 500 is electrically connected to the ECU 100, and its operation is controlled by the ECU 100.

On the other hand, the vehicle 10 is provided with various sensors including a steering torque sensor 15, a steering wheel angle sensor 16, and a VRGS rotation angle sensor 17.

The steering torque sensor 15 is a sensor capable of detecting the steering torque MT applied via the steering wheel 11 from the driver. Explaining it more specifically, the upper steering shaft 12 has such a configuration that it is divided into an upstream part and a downstream part and that the parts are mutually coupled by using a not-illustrated torsion bar. To the both ends on the upstream side and the downstream side of the torsion bar, rings for detecting a rotational phase difference are fixed. The torsion bar is twisted in its rotational direction in accordance with the steering torque (i.e. the steering torque MT) transmitted through the upstream part of the upper steering shaft 12 when the driver of the vehicle 10 operates the steering wheel 11, and the torsion bar can transmit the steering torque to the downstream part while generating the twist. Therefore, upon the transmission of the steering torque, there is the rotational phase difference between the rings for detecting the rotational phase difference described above. The steering torque sensor 15 can detect the rotational phase difference, convert the rotational phase difference to the steering torque, and output it as an electrical signal corresponding to the steering torque MT. Moreover, the steering torque sensor 15 is electrically connected to the ECU 100, and the detected steering torque MT is referred to by the ECU 100 with a regular or irregular period.

The steering wheel angle sensor 16 is an angle sensor capable of detecting the steering wheel angle $\delta h$ which indicates the rotation amount of the upper steering shaft 12. The steering wheel angle sensor 16 is electrically connected to the ECU 100, and the detected steering wheel angle $\delta h$ is referred to by the ECU 100 with a regular or irregular period.

The VGRS rotation angle sensor 17 is a rotary encoder capable of detecting a VGRS rotation angle $\delta vgrs$ which is a relative rotation angle between the lower steering shaft 13 and the housing 21 (i.e. equivalent with the upper steering shaft 12 in terms of the rotation angle) of the VGRS actuator 200. The VGRS rotation angle sensor 17 is electrically connected to the ECU 100, and the detected VGRS rotation angle $\delta vgrs$ is referred to by the ECU 100 with a regular or irregular period.

Incidentally, the VGRS rotation angle $\delta vgrs$ detected by the VGRS rotation angle sensor 17 corresponds to the front wheel steering angle $\delta f$ in a one-to-one manner by being added to the steering wheel angle $\delta h$.

The ARS actuator 600 is a rear wheel steering angle varying apparatus provided with a not-illustrated steering wheel control rod, an ARS motor, and a direct acting mechanism for converting the rotation of the ARS motor into a reciprocating motion of the steering angle control rod, and it is one example of the "rear wheel steering angle varying apparatus" of the present invention. The rear wheels RL and RR are coupled with both ends of the steering angle control rod via a support, such as a knuckle. If the steering angle control rod is stroked in a left or right direction by a driving force applied from the ARS motor, then, a rear wheel steering angle $\delta r$ changes in accordance with a stroke amount.

The ARS driving apparatus 700 is an electric drive circuit which includes a PWM circuit, a transistor circuit, an inverter and the like and which can electrify the ARS motor. The ARS driving apparatus 700 is electrically connected to a not-illustrated battery, and it can supply a drive voltage to the ARS motor by using electric power supplied from the battery. Moreover, the ARS driving apparatus 700 is electrically connected to the ECU 100, and its operation is controlled by the ECU 100.

The vehicle 10 is provided with an ARS rotation angle sensor 18. The ARS rotation angle sensor 18 is a rotary encoder capable of detecting an ARS rotation angle $\delta ars$ which is a rotation angle of the ARS motor accommodated in the ARS actuator 600. The ARS rotation angle sensor 18 is electrically connected to the ECU 100, and the detected ARS rotation angle $\delta ars$ is referred to by the ECU 100 with a regular or irregular period.

Incidentally, the ARS rotation angle $\delta ars$ detected by the ARS rotation angle sensor 18 corresponds to the rear wheel steering angle $\delta r$ in a one-to-one manner, and the ECU 100 always knows the rear wheel steering angle $\delta r$ on the basis of information about the ARS rotation angle $\delta ars$ transmitted from the ARS rotation angle sensor 18.

The vehicle 10 is further provided with the ECB 800. The ECB 800 is an electronically-controlled braking apparatus as one example of the "braking force varying apparatus" of the present invention, capable of applying a braking force individually to each of the left and right, front and rear wheels of the vehicle 10. The ECB 800 is provided with: a brake actuator 810; and braking apparatuses 820FL, 820FR, 820RL, and 820RR corresponding to the left front wheel FL, the right front wheel FR, the left rear wheel RL and the right rear wheel RR, respectively.

The brake actuator 810 is a hydraulic control actuator configured to supply hydraulic oil at a desired hydraulic pressure, individually to each of the braking apparatuses 820FL, 820FR, 820RL, and 820RR. The brake actuator 810 is provided with a master cylinder, an electric oil pump, a plurality of hydraulic transmission paths, an electromagnetic valve disposed in each of the hydraulic transmission paths, and the like, and it can control the opening/closing state of the electromagnetic valve, thereby controlling the hydraulic pressure of the hydraulic oil supplied to a wheel cylinder provided for each braking apparatus, individually in each braking apparatus. The hydraulic pressure of the hydraulic oil has a one-to-one relation with the pressing force of a braking pad provided for each braking apparatus, and the high or low hydraulic pressure of the hydraulic oil corresponds to the large or small braking force acting between each braking apparatus and each wheel, respectively. The brake actuator 810 is electrically connected to the ECU 100, and the braking force applied to each wheel from each braking apparatus is controlled by the ECU 100.

Incidentally, the ECB 800 can adopt various practical aspects of various known electronically-controlled braking apparatuses, and the detailed explanation thereof will be omitted herein.

To the left front wheel FL, the right front wheel FR, the left rear wheel RL, and the right rear wheel RR of the vehicle 10, there are attached wheel speed sensors 19FL, 19FR, 19RL, and 19RR capable of detecting rotational speeds of the respective wheels, respectively. Each of the wheel speed sensors is electrically connected to the ECU 100, and the detected each wheel speed is always known by the ECU 100.

Here, the ECB 800 functions as a lock preventing apparatus such as an anti-lock braking system (ABS) by the control of the ECU 100. In other words, in this case, the ECU 100 always knows the wheel speed detected for each wheel and judges or determines a slip state of each wheel on the basis of the wheel speed of each wheel. If the lock of the wheel is detected by the detected wheel speed, the hydraulic pressure to be supplied to the braking apparatus corresponding to the wheel in which the lock state is detected is adjusted such that a slip ratio of the wheel of interest is capable of providing the braking force most.

<2. Operation of Embodiment>

Hereinafter, with reference to the drawings as occasion demands, as the operation of the embodiment, the rear wheel steering interference compensation control performed by the ECU 100 will be explained.

<2-1. Outline of Steering Angle Control of Front and Rear Wheels>

Firstly, in order to explain the necessity of the rear wheel steering interference compensation control, steering wheel control of the front and rear wheels will be explained.

In the embodiment, a first target front wheel steering angle δftg1, which is a target value of the front wheel steering angle δf in the normal region, is calculated by the following equation (1).

$$\delta ftg1 = \delta h \times GRf \times Ghf \quad (1)$$

In the above equation (1), GRf is a front wheel gear ratio. The front wheel gear ratio GRf is a ratio of the front wheel steering angle δf with respect to the steering wheel angle δh, i.e. a steering transmission ratio of the front wheels. Incidentally, the steering wheel angle δh has a positive or negative sign depending on a steering direction.

Moreover, in the above equation (1), Ghf is a steering wheel angular velocity gain. The steering wheel angular velocity gain Ghf is a gain for correcting the front wheel steering angle which varies depending on a steering wheel angular velocity δh' as a time differential value of the steering wheel angle δh.

The ECU 100 is configured to calculate the VGRS rotation angle δvgrs on the basis of the steering wheel angle δh so as to obtain the first target front wheel steering angle δftg1 defined by the above equation (1) and to control the VGRS actuator 200 so as to obtain the calculated VGRS rotation angle δvgrs.

However, the aspect of setting the first target front wheel steering angle δftg1 in the normal region is merely one example, and it is obvious that various known aspects can be applied regarding the control of the front wheel steering angle δf in the normal region.

Figure 2:
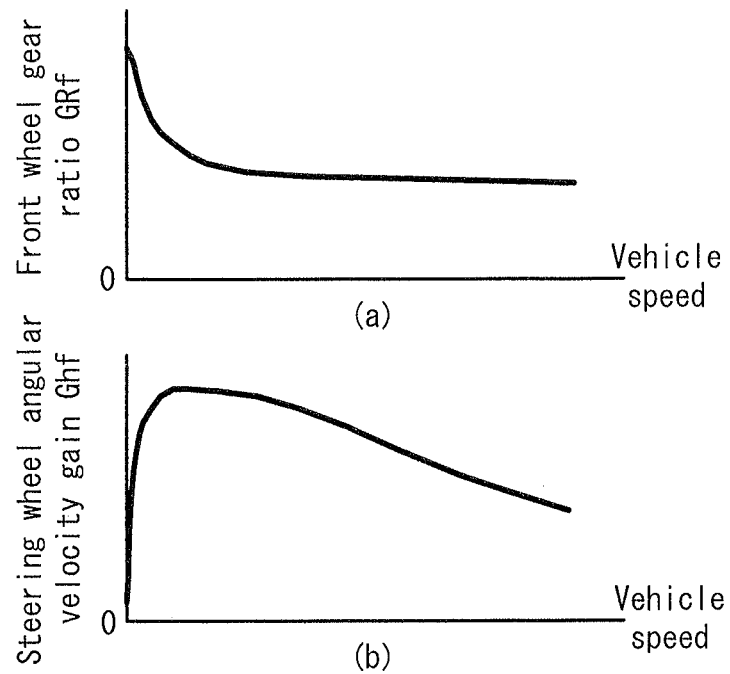
FIG. 2 are views illustrating one steering characteristic of front wheels in a normal region in the vehicle in FIG. 1.

Here, with reference to FIG. 2, the aspect of controlling the front wheel steering angle δf in the normal region will be supplementarily explained. FIG. 2 are views illustrating one steering characteristic of the front wheels in the normal region.

In FIG. 2(a) is a view showing the vehicle characteristic of the front wheel gear ratio GRf.

As illustrated, the front wheel gear ratio GRf is significantly high in an extremely low vehicle speed region and reduces relatively mildly with an increase in a vehicle speed in the other region. In other words, qualitatively speaking, in a vehicle speed region in which relatively high steering torque is required due to a large axial force of the wheels, such as a stationary steering or extremely low speed region, the steering transmission ratio becomes high to obtain a higher steering angle with less steering wheel operation. On the other hand, since a change in the vehicle behavior with respect to the steering angle change increases with increasing vehicle speed, the front wheel gear ratio GRf becomes less on a higher vehicle speed side. Incidentally, the characteristic in FIG. 2(a) is merely one example.

In FIG. 2(b) is a view showing the vehicle characteristic of the steering wheel angular velocity speed gain Ghf of the front wheels. The steering wheel angular velocity gain Ghf is a gain according to the steering wheel angular velocity δh' as described above, and illustrated is the vehicle characteristic of the steering wheel angular velocity gain Ghf at one steering wheel angular velocity δh'. As illustrated, the steering wheel angular velocity speed gain Ghf is generally set such that the first target front wheel steering angle δftg1 becomes small with increasing vehicle speed. Incidentally, the characteristic in FIG. 2(b) is also merely one example of practical aspects which can be adopted by the steering wheel angular velocity gain Ghf.

On the other hand, in the embodiment, a first target rear wheel steering angle δrtg1, which is a target value of the rear wheel steering angle δr in the normal region, is calculated by the following equation (2).

$$\delta rtg1 = -\delta h \times GRr \times Ghr \quad (2)$$

In the above equation (2), GRr is a rear wheel gear ratio. The rear wheel gear ratio GRr is a ratio of the rear wheel steering angle δr with respect to the steering wheel angle δh, i.e. a steering transmission ratio of the rear wheels. However, since the ARS actuator 600 is a rear wheel steering angle varying apparatus of a type that it is not mechanically coupled with the steering wheel 11, the steering transmission ratio is a so-called pseudo-steering transmission ratio.

Moreover, in the above equation (2), Ghr is a steering wheel angular velocity gain. The steering wheel angular velocity gain Ghr is a gain for correcting the rear wheel steering angle which varies depending on the steering wheel angular velocity δh' as the time differential value of the steering wheel angle δh.

The ECU 100 is configured to calculate the ARS rotation angle δars on the basis of the steering wheel angle δh so as to obtain the first target rear wheel steering angle δrtg1 defined by the above equation (2) and to control the ARS actuator 600 so as to obtain the calculated ARS rotation angle δars.

However, the aspect of setting the first target rear wheel steering angle δrtg1 in the normal region is merely one example, and it is obvious that various known aspects can be applied regarding the control of the rear wheel steering angle δr in the normal region.

Figure 3:
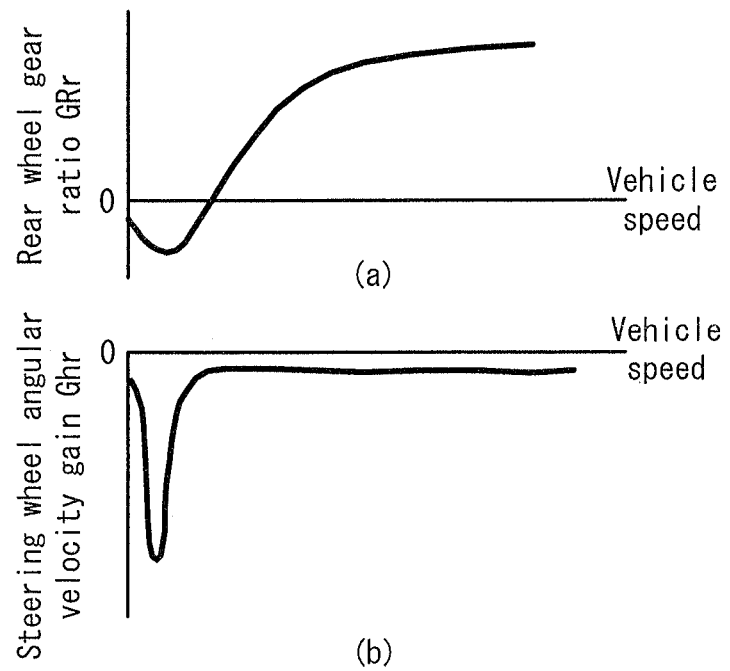
FIG. 3 are views illustrating one steering characteristic of rear wheels in the normal region in the vehicle in FIG. 1.

Here, with reference to FIG. 3, the aspect of controlling the rear wheel steering angle δr in the normal region will be supplementarily explained. FIG. 3 are views illustrating one steering characteristic of the rear wheels in the normal region.

In FIG. 3(a) is a view showing the vehicle characteristic of the rear wheel gear ratio GRr.

As illustrated, the rear wheel gear ratio GRr has a negative value in a low vehicle speed region and is reversed to positive at a change vehicle speed Vchg (not illustrated) experimentally adapted in advance as a boundary value. Here, the positive or negative sign of the rear wheel gear ratio GRr means a turning direction of the rear wheels, and the reverse of the sign means the reverse of the turning direction of the rear wheels. Incidentally, the characteristic in FIG. 3(a) is merely one example, and the aspect of setting the rear wheel gear ratio GRr is not limited in any way.

FIG. 3(b) shows the vehicle characteristic of the steering wheel angular velocity speed gain Ghr of the rear wheels. The steering wheel angular velocity gain Ghr is a gain according to the steering wheel angular velocity δh' as the time differential value of the steering wheel angle δh, and illustrated is the vehicle characteristic of the steering wheel angular velocity gain Ghr at one steering wheel angular velocity δh'.

Here, the steering wheel angular velocity gain Ghr has a negative value in an entire vehicle speed region. Therefore, from the above equation (2), the first target rear wheel steering angle δrtg1 has a different sign from that of the steering wheel angle δh in a relatively low vehicle speed region in which the vehicle speed is less than the change vehicle speed, and has the same sign as that of the steering wheel angle δh in a relatively high vehicle speed region in which the vehicle speed is greater than or equal to the change vehicle speed Vchg.

Here, in particular, the first target front wheel steering angle δftg1 described above has the same sign as that of the steering wheel angle δh in the entire vehicle region, and thus, as a necessity, the first target front wheel steering angle δftg1 and the first target rear wheel steering angle δrtg1 have an anti-phase relation in the relatively low vehicle speed region and have an in-phase relation in the relatively high speed region.

Incidentally, the steering wheel angular velocity gain Ghr has a large absolute value in the relatively low vehicle speed region and has an almost constant value in the relatively high vehicle speed region from the vicinity of a reference vehicle speed; however, such a characteristic is merely one example.

<2-2. Outline of μ-Split Braking Control>

Next, in order to explain the necessity of the rear wheel steering interference compensation control in the same manner, the μ-split braking control will be explained.

The braking force acting between the wheel and a road surface is influenced by a friction coefficient μ of the road surface. More specifically, even if a uniform hydraulic pressure is supplied to the braking apparatuses for the respective wheels in order to obtain a uniform braking force for all the wheels, the braking force acting on the wheel on a higher μ road side is greater than the braking force acting on the wheel on a lower μ road side.

Therefore, if the friction coefficient of the road surface with which the left-side wheel is in contact is different from the friction coefficient of the road surface with which the right-side wheel is in contact, a left-right braking force difference ΔFx occurs in the vehicle 10. The left-right braking force difference ΔFx is a factor for generating a yaw moment around the center of gravity in the vehicle 10.

The μ-split braking control is automatic steering control, as one example of the "automatic steering" of the present invention, for canceling out the yaw moment around the center of gravity by using a yaw moment intentionally generated by the steering angle change in the front and rear wheels in cases where the vehicle 10 drives on a road surface with the different friction coefficients as described above.

Figure 4:
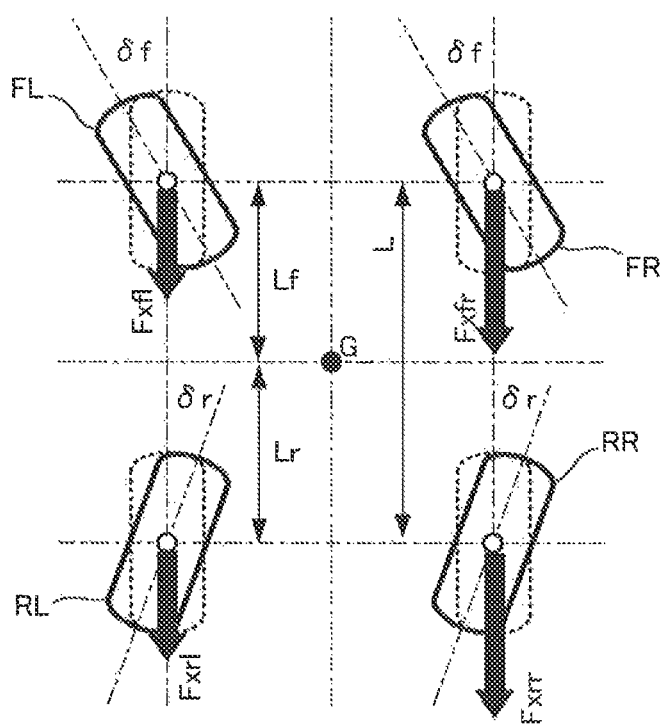
FIG. 4 is a conceptual view showing µ-split braking control in the vehicle in FIG. 1.

Now, with reference to FIG. 4, the mechanism of the μ-split braking control will be explained. FIG. 4 is a conceptual view showing the μ-split braking. Incidentally, in FIG. 4, portions overlapping those of FIG. 1 will carry the same reference numerals, and the explanation thereof will be omitted as occasion demands.

In FIG. 4, it is assumed that a braking force Fxfl acts on the left front wheel FL, a braking force Fxfr acts on the right front wheel FR, a braking force Fxrl acts on the left rear wheel RL, and a braking force Fxrr acts on the right rear wheel RR and that a relation of Fxfl<Fxfr and Fxrl<Fxrr holds true. In this case, the left-right braking force difference ΔFx in the vehicle 10 is expressed by the following equation (3).

$$\Delta Fx = (Fxfr + Fxrr) - (Fxfl + Fxrl) \quad (3)$$

On the other hand, a yaw moment Mz generated around the center of gravity G of the vehicle 10 by the left-right braking force difference ΔFx is defined by the following equation (4) under the assumption that a tread of the vehicle 10 (which is a distance between contact points of the left and right wheels and which is equal between the front and rear wheels in the embodiment) is Tr.

$$Mz = \Delta Fx / (Tr/2) \quad (4)$$

Here, if the yaw moment Mz generated by the left-right braking force difference is canceled out by using the yaw moment generated by the steering angle change in the front and rear wheels so as not to generate a lateral force in each vehicle, the following equations (5) and (6) hold true.

$$Mz = 2 \cdot Kf \cdot \delta f \cdot Lf - 2 \cdot \delta r \cdot Lr \quad (5)$$

$$Kf \cdot \delta f + Kr \cdot \delta r = 0 \quad (6)$$

As a result, in the end, a second target front wheel steering angle δftg2, which is a target value of the front wheel steering angle δf, is obtained by the following equation (7), and a second target rear wheel steering angle δrtg2, which is a target value of the rear wheel steering angle δr, is obtained by the following equation (8).

$$\delta f = -Mz / \{2 \cdot (L \cdot Kf)\} \quad (7)$$

$$\delta r = Mz / \{2 \cdot (L \cdot Kr)\} \quad (8)$$

Incidentally, Lf is a distance between the center of gravity G and a line segment connecting the contact points of the left and right front wheels, and Lr is a distance between the center of gravity G and a line segment connecting the contact points of the left and right rear wheels. Moreover, Kf is front wheel equivalent cornering power, and Kr is rear wheel equivalent cornering power. As is clear from the above equations (7) and (8), in the μ-split braking control performed in a situation in which the left-right braking force difference ΔFx is generated in the vehicle 10, the directions of the target steering angles of the front and rear wheels have a mutually anti-phase relation.

Incidentally, the μ-split braking control is explained here, but the automatic steering control performed in the vehicle 10 is not limited to the μ-split braking control. In the explanation hereinafter, however, the target front wheel steering angle and the target rear wheel steering angle set in various automatic steering controls will be uniformly expressed as the second target front wheel steering angle δftg2 and the second target rear wheel steering angle δrtg2, respectively.

Incidentally, another example of the automatic steering control may be trajectory following control such as, for example, the LKA.

In this case, the operation of the various actuators such as the VGRS actuator 300 and the ARS actuator 700 may be controlled, for example, so as to determine a target value of lateral acceleration generated in a vehicle body on the basis of a white line imaged by an in-vehicle camera or the like, a yaw angle deviation between a lane mark and the vehicle body, a radius (or curvature) of a driving route, a yaw rate, or the like and so as to obtain the lateral acceleration corresponding to the determined target value. Moreover, in realizing such an automatic driving state, the assistance of the steering torque by the steering torque assisting apparatus such as the EPS actuator may be incidentally performed.

<2-3. Outline of Rear Wheel Steering Interference Compensation Control>

As explained above, in the vehicle 10, as the target values associated with the front wheel steering angle δf, there are the first target front wheel steering angle δftg1 in the normal region and the second target front wheel steering angle δftg2 associated with the automatic steering control. In the same manner, as the target values associated with the rear wheel steering angle δr, there are the first target rear wheel steering angle δrtg1 in the normal region and the second target rear wheel steering angle δrtg2 associated with the automatic steering control.

The ECU 100 basically sets each of a final target front wheel steering angle δftg in accordance with the following equation (9) and a final target rear wheel steering angle δrtg in accordance with the following equation (10) in cases where the steering angle control in the normal region and the steering angle control in the automatic steering control overlap each other on a time axis. Incidentally, the following equations (9) and (10) are also one example associated with a method of calculating the final target steering angles based on the respective target steering angles, and the method of calculating the final target steering angles may also adopt any known aspect as long as each target steering angle can contribute as a constituent element.

$$\delta ftg = \delta ftg1 + \delta ftg2 \quad (9)$$

$$\delta rtg = \delta rtg1 + \delta rtg2 \quad (10)$$

By the way, in some cases, the direction of controlling the rear wheel steering angle differs between the steering angle control in the normal region and the steering angle control in the automatic steering. In other words, the steering angle control in the normal region and the automatic steering control interfere with each other with regard to the control of the rear wheel steering angle.

In such a case, if the target rear wheel steering angle $\delta rtg1$ in the normal region and the target rear wheel steering angle $\delta rtg2$ in the automatic steering control are simply added in accordance with the above equation (10), both the target rear wheel steering angles are canceled out to reduce the rear wheel steering angle $\delta r$, and in an extremely case, the final target rear wheel steering angle $\delta rtg$ becomes zero. This is not desirable from the viewpoint of stably maintaining the vehicle behavior because both the steering angle control in the normal region and the automatic steering control are in a revocation state.

Thus, in the embodiment, the rear wheel steering interference compensation control is performed by the ECU 100. The rear wheel steering interference compensation control is control for accurately selecting one to be limited and for accurately limiting the one to be limited in cases where the interference of the rear wheel steering occurs as described above.

<2-4. Details of Rear Wheel Steering Interference Compensation Control>

Figure 5:
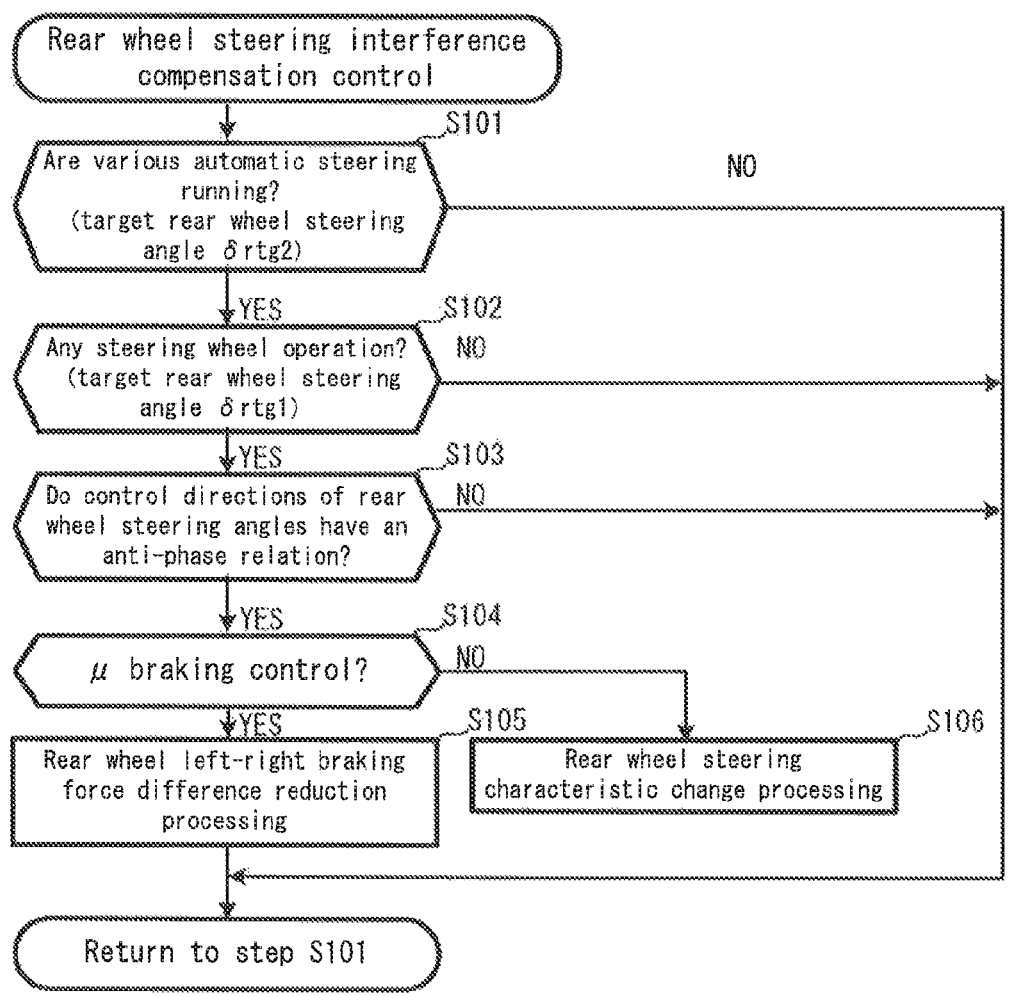
FIG. 5 is a flowchart showing rear wheel steering interference compensation control performed by an ECU in the vehicle in FIG. 1.

Now, with reference to FIG. 5, the details of the rear wheel steering interference compensation control will be explained. FIG. 5 is a flowchart showing the rear wheel steering interference compensation control.

In FIG. 5, the ECU 100 judges whether or not the various automatic steering controls are running (step S101). If the various automatic steering controls are not running (the step S101: NO), the second target rear wheel steering angle $\delta rtg2$ is not set, and thus, the control interference does not occur between the rear wheel steering angle control in the normal region and the rear wheel steering angle control by the automatic steering. Therefore, until the automatic steering control is started, the step S101 is repeatedly performed.

Incidentally, if there are the plurality of automatic steering controls, the running conditions thereof are individually defined in the respective automatic steering controls in many cases. Therefore, criteria associated with the judgment in the step S101 can have diversity. Therefore, the sequential description of the detailed criteria thereof is omitted here, but considering that the automatic steering controls are steering controls which do not work with the steering wheel operation accompanied by the control of a vehicle state quantity performed by the ECU 100, there is no practical difficulty in that the ECU 100 always knows whether or not the automatic steering controls are performed.

If the various automatic steering controls are running (the step S101: YES), the ECU 100 judges whether or not there is the steering wheel operation by the driver (step S102). If there is no steering wheel operation by the driver (the step S102: NO), the first target rear wheel steering angle $\delta rtg1$ is not set and the control interference does not occur between the rear wheel steering angle control in the normal region and the rear wheel steering angle control in the automatic steering. Therefore, the processing is returned to the step S101.

Incidentally, a criterion associated with the judgment of whether or not there is the steering wheel operation by the driver is not limited at all, as long as the steering wheel operation based on the driver's steering intention can be detected in a situation in which the second target rear wheel steering angle $\delta rtg2$ is set. For example, the ECU 100 may judge that there is the steering wheel operation by the driver while the automatic steering controls are running if the steering torque MT or the steering wheel angular velocity $\delta h'$ exceeds a criterion value in a situation in which the steering wheel angle $\delta h$ exceeds a criterion value.

If it is judged that there is the steering wheel operation by the driver in the step S102 (the step S102: YES), the ECU 100 judges whether or not the first target rear wheel steering angle $\delta rtg1$ and the second target rear wheel steering angle $\delta rtg2$ have an anti-phase relation (step S103).

Whether or not they have the anti-phase relation is judged by comparing the signs of the first target front wheel steering angle $\delta ftg1$ and the second target front wheel steering angle $\delta ftg2$ which are set with the control logic as described above and by comparing the signs of the first target rear wheel steering angle $\delta rtg1$ and the second target rear wheel steering angle $\delta rtg2$. More specifically, if the target steering angles of the front wheels have the same sign and the target steering angles of the rear wheels have different signs, it is judged that the rear wheel steering angle control in the normal region and the rear wheel steering angle control in the automatic steering have an anti-phase relation in the step S103.

If they do not have the anti-phase relation (the step S103: NO), i.e. if the first target rear wheel steering angle $\delta rtg1$ and the second target rear wheel steering angle $\delta rtg2$ may be simply added in accordance with the above equation (10), the processing is returned to the step S101.

On the other hand, if they have the anti-phase relation (the step S103: YES), the ECU 100 judges whether or not the rear wheel steering angle control which interferes with the rear wheel steering angle control in the normal region is based on the μ-split braking control (step S104). In other words, the ECU 100 judges whether or not the μ-split braking control is performed.

The judgment processing in the step S104 is performed on the basis of whether or not the two front wheels are undergoing ABS braking and the left-right braking force difference ΔFx is greater than or equal to a reference value, or whether or not the friction coefficient μ of the contact road surface of the left and right wheels is greater than or equal to a reference value. In other words, if the two front wheels are undergoing the ABS braking and the left-right braking force difference ΔFx is greater than or equal to the reference value or the friction coefficient μ of the contact road surface of the left and right wheels is greater than or equal to the reference value, it is judged that the μ-split braking control is running. Incidentally, if even the type f the automatic steering in execution is clearly judged, the judgment processing in the step S104 may be performed on the basis of the judgment result or the like.

If the automatic steering control performed is not the μ-split braking control (the step S104: NO), i.e. if it is, for example, the control of following a target driving route including the LKA described above or the vehicle behavior control performed by cooperatively controlling various braking/driving forces and the front and rear steering angles such as the VSC, then, the ECU 100 performs rear wheel steering characteristic change processing (step S106). The rear wheel steering characteristic change processing is the processing of limiting an influence of the rear wheel steering angle control in the normal region (i.e. the first target rear wheel steering angle δrtg1) on the final rear wheel steering angle (i.e. the target rear wheel steering angle δrtg).

On the other hand, if the automatic steering control performed is the μ-split braking control (the step S104: YES), the ECU 100 performs rear wheel left-right braking force difference reduction processing (step S105). The rear wheel left-right braking force difference reduction processing is the processing of limiting an influence of the rear wheel steering angle control in the μ-split braking control (i.e. the second target rear wheel steering angle δrtg2) on the final rear wheel steering angle (i.e. the target rear wheel steering angle δrtg).

If the step S105 or the step S106 is performed, the processing is returned to the step S101. The rear wheel steering interference compensation control is performed in the aforementioned manner.

Here, according to the rear wheel steering interference compensation control, if the rear wheel steering angle control in the normal region and the rear wheel steering angle control in the automatic steering control interfere with each other, basically, the rear wheel steering characteristic change processing in the step S106 is performed, and the rear wheel steering angle control in the normal region is limited. On the other hand, the rear wheel left-right braking force difference reduction processing in the step S105 is performed only if the automatic steering control is the μ-split braking control, and the rear wheel steering angle control by the μ-split braking control is limited.

Here, in particular, the trajectory following control such as the LKA is configured to quickly end in accordance with a predetermined termination condition separately defined, for example, in cases where there is an override operation by the driver. Thus, the limitation of the rear wheel steering angle control in cases where such a termination condition is not satisfied can cause less stable vehicle behavior. Moreover, the behavior stabilization control which requires cooperative control of various state controlled variables in order to stabilize the vehicle behavior from the first, such as the VSC, is to be prioritized over the steering wheel operation by the driver. In other words, upon the control interference as described above, the rear wheel steering angle control in the normal region according to the steering wheel operation by the driver is limited, by which it is possible to preferably prevent the unstable vehicle behavior.

By the way, a yaw moment to be generated by the change in the rear wheel steering angle in the μ-split braking control is to suppress an unintended yaw moment generated by the left-right braking force difference ΔFx. In other words, the rear wheel steering angle δr and the left-right braking force difference ΔFx as the state controlled variables of the vehicle 10 have a mutually complementary relation. Therefore, the second target rear wheel steering angle δrtg2 in the μ-split braking control can be reduced reasonably in a normal control range by reducing the left-right braking force difference ΔFx which has a complementary relation therewith (of course, such a reasonable reduction is also one aspect of the correction).

On the other hand, taking into account that the rear wheel steering angle control in the normal region according to the steering wheel operation is based on the driver's intention, there is no reason to limit the rear wheel steering angle control in the normal region in cases where the other interference factor (i.e. the second target rear wheel steering angle δrtg2) can be reduced reasonably via the control of reducing the state controlled variable which has the complementary relation therewith as described above. In other words, if the rear wheel steering angle control in the μ-split braking control interferes with the rear wheel steering angle control in the normal range, it is more reasonable to limit the μ-split braking control, and it is extremely useful in practice in that the driver's intention can be reflected as much as possible without causing the unstable vehicle behavior.

As described above, according to the embodiment, the one to be limited in cases where the control interference of the rear wheels occurs can be accurately limited, and the vehicle behavior can be maintained more desirably.

Now, the details of the rear wheel steering characteristic change processing will be explained.

In the rear wheel characteristic change processing, the final target rear wheel steering angle δrtg is calculated in accordance with the following equation (11).

$$\delta rtg = \delta rtg1 \cdot GN + \delta rtg2 \qquad (11)$$

In the above equation (11), GN is a correction gain set in a range of 1 or less. In the embodiment, a correction gain GN1 set in accordance with the steering wheel angular velocity δh', a correction gain GN2 set in accordance with a vehicle speed V, or an integrated value thereof is used. For the correction gains GN1 and GN2, appropriate values according to a driving condition at that time point are selected from a correction gain map stored in the ROM in advance.

Figure 6:
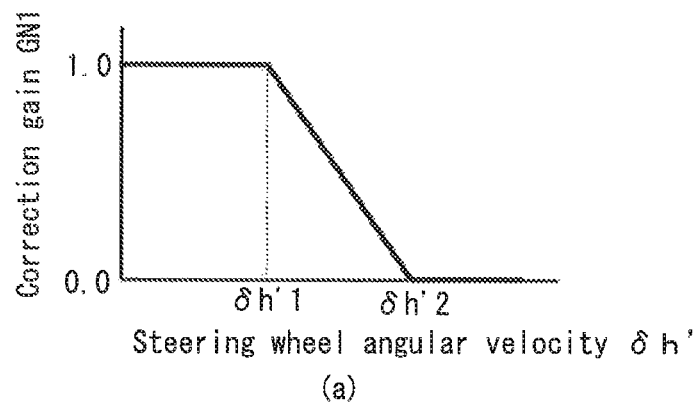
FIG. 6 are views showing one characteristic of correction gains in rear wheel steering characteristic change processing associated with the rear wheel steering interference compensation control in FIG. 2.
Figure 6:
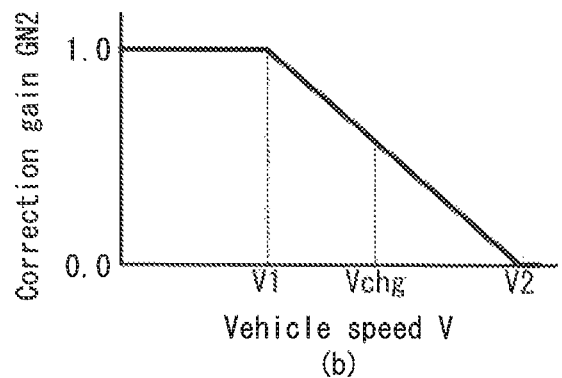

Now, with reference to FIG. 6, the correction gains in the rear wheel steering characteristic change processing will be explained. FIG. 6 are views showing one characteristic of the various correction gains in the rear wheel steering characteristic change processing.

In FIG. 6, FIG. 6(a) is a view showing the characteristic of the correction gain GN1 with respect to the steering wheel angular velocity δh'. As illustrated, the correction gain GN1 is set to "1" corresponding to practically no correction in an operating region of δh'<δh'1 which corresponds to that the steering wheel 11 is operated relatively slowly, and the correction gain GN1 is set to "0" in which the rear wheel steering angle control in the normal region is practically invalidated in an operating region of δh'≥δh'2 which corresponds to that the steering wheel 11 is operated relatively suddenly. Moreover, in a middle region of δh'1≤δh'<δh'2, the correction gain GN1 decreases linearly.

FIG. 6(b) is a view showing the characteristic of the correction gain GN2 with respect to the vehicle speed V. As illustrated, the correction gain GN2 is set to "1" corresponding to practically no correction in a low vehicle speed region of V<V1 which corresponds to that the vehicle speed V is relatively low, and the correction gain GN2 is set to "0" in which the rear wheel steering angle control in the normal region is practically invalidated in a high vehicle speed region of V≥V2 which corresponds to that the vehicle speed V is relatively high. Moreover, in a middle region of V1≤V<V2, the correction gain GN2 decreases linearly.

Incidentally, the aforementioned change vehicle speed Vchg in which the direction of controlling the rear wheel steering angle in the normal region is changed from an anti-phase relation in which the control direction and the front wheels are anti-phase and to an in-phase relation in which the control direction and the front wheels are in-phase exists in the intermediate region. Therefore, the steering angle limitation based on the correction gain GN2 is effective in a region in which the vehicle speed V is greater than or equal to Vchg.

As described above, in the rear wheel steering characteristic change processing, the first target rear wheel steering angle δrtg1, which is the target value of the rear wheel steering angle in the normal region, is limited not under a binary limiting aspect of whether or not to be limited but under a continuous limiting aspect according to the driving condition (which is the vehicle speed V or the steering wheel angular velocity δh' in the embodiment) of the vehicle. Therefore, without preventing the stabilization of the vehicle behavior, it is possible to provide a natural steering feeling in which the driver's steering intention is reflected as much as possible.

Next, the details of the rear wheel left-right braking force difference reduction processing will be explained.

In the rear wheel left-right braking force difference reduction processing, in order to suppress the generation of the yaw moment associated with the magnitude of the second target rear wheel steering angle δrtg2, a rear wheel left-right braking force difference ΔFxr (ΔFxr=Fxrr−Fxrl) is corrected to the reduction side by correction processing according to the following equation (12).

$$Fxrhtg = Fxrh \cdot GNh \cdot (GNv \text{ or } Gnt) \qquad (12)$$

In the above equation (12), Fxrhtg is a target value of the braking force of the rear wheel on the high friction coefficient side, and Fxrh is the braking force of the rear wheel on the high friction coefficient side. The above equation (12) is a correction equation for reducing the rear-wheel left-right braking force difference ΔFxr by reducing the friction force of the rear wheel on the high friction coefficient side. Incidentally, which of the left and right rear wheels corresponds to the high friction coefficient side is judged, for example, on the basis of the wheel speed of each wheel.

In the above equation (12), GNh is a steering gain set in a range of 1 or less in accordance with the steering wheel angular velocity δh'. Moreover, GNv is a vehicle speed gain set in a range of 1 or less in accordance with the vehicle speed V. Moreover, Gnt is a braking time gain set in a range of 1 or less in accordance with an elapsed time T from a braking start time point. For each of the correction gains, appropriate values according to the driving condition at that time point are selected from the correction gain map stored in the ROM in advance.

Figure 7:
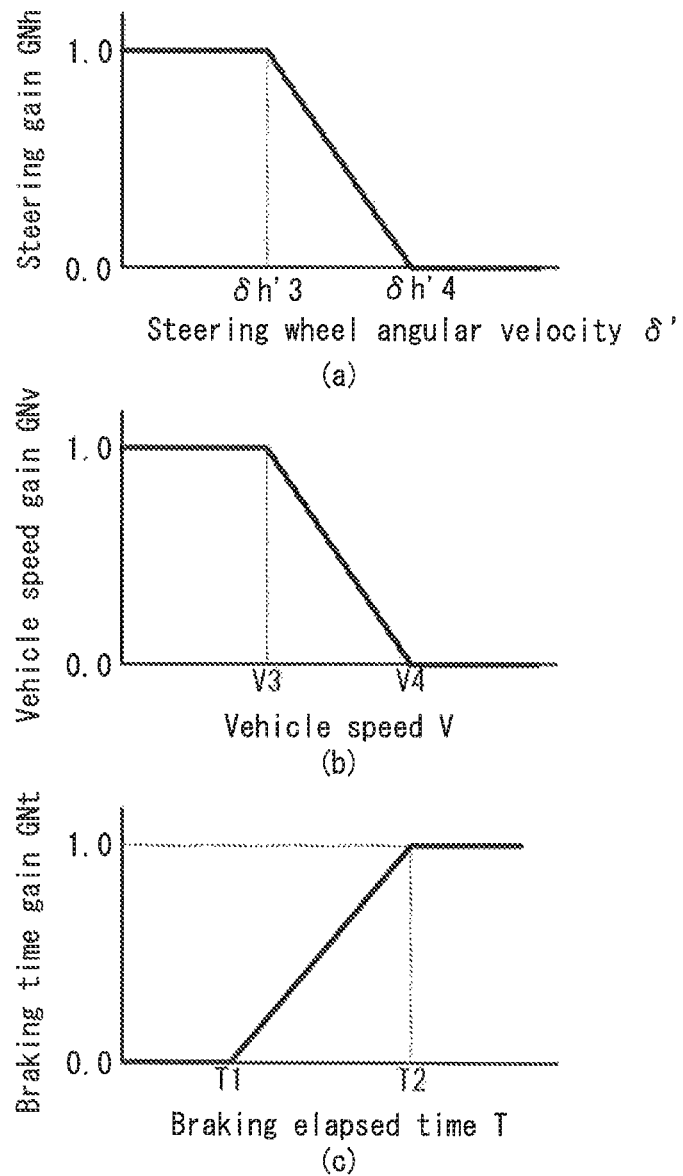
FIG. 7 are views showing one characteristic of correction gains in left-right braking force difference reduction processing associated with the rear wheel steering interference compensation control in FIG. 2.

Now, with reference to FIG. 7, various correction gains in the rear wheel left-right braking force difference reduction processing will be explained. FIG. 7 are views showing one characteristic of the various correction gains in the left-right braking force difference reduction processing.

In FIG. 7(a) is a view showing the characteristic of the steering gain GNh with respect to the steering wheel angular velocity δh'. As illustrated, the steering gain GNh is set to "1" corresponding to practically no correction in an operating region of δh'<δh'3 which corresponds to that the steering wheel 11 is operated relatively slowly, and the steering gain GNh is set to "0" which corresponds to that the braking force of the rear wheel on the high friction coefficient side is zero in an operating region of δh≥δh'4 which corresponds to that the steering wheel 11 is operated relatively suddenly. Moreover, in a middle region of δh'3≤δh'4, the steering gain GNh decreases linearly.

FIG. 7(b) is a view showing the characteristic of the vehicle speed gain GNv with respect to the vehicle speed V. As illustrated, the vehicle speed gain GNv is set to "1" corresponding to practically no correction in a low vehicle speed region of V<V3 which corresponds to that the vehicle speed V is relatively low, and the vehicle speed gain GNv is set to "0" which corresponds to that the braking force of the rear wheel on the high friction coefficient side is zero in a high vehicle speed region of V≥V4 which corresponds to that the vehicle speed V is relatively high. Moreover, in a middle region of V3≤V<V4, the vehicle speed gain GNv decreases linearly.

FIG. 7(c) is a view showing the characteristic of the braking time gain GNt with respect to a braking elapsed time T. As illustrated, the braking time gain GNt is set to "0" which corresponds to that the braking force of the rear wheel on the high friction coefficient side is zero in a time region of T<T1 which corresponds to that the braking elapsed time T is relatively short, and the braking time gain GNt is set to "1" corresponding to practically no correction in a time region of T≥T2 which corresponds to that the braking elapsed time T is relatively long. Moreover, in a middle region of T1≤T<T2, the braking time gain GNt increases linearly.

As described above, in the rear wheel left-right braking force difference reduction processing, the second target rear wheel steering angle δrtg2 which is the target value of the rear wheel steering angle in the μ-split braking control as one type of the automatic steering control is limited not under a binary limiting aspect of whether or not to be limited but under a continuous limiting aspect according to the driving condition (which is the vehicle speed V, the steering wheel angular velocity δh', or the braking elapsed time T in the embodiment) of the vehicle. Therefore, without preventing the stabilization of the vehicle behavior, it is possible to provide a natural steering feeling in which the driver's steering intention is reflected as much as possible.

In particular, if the correction by the braking time gain GNt according to the braking elapsed time T is performed, the braking force of the rear wheel on the high friction coefficient side approaches a proper target braking force according to a braking demand, after a lapse of reasonable time immediately after the braking start. Therefore, the overall shortage of the braking force due to the temporal reduction of the braking force even only in the rear wheel and prolonged braking time are prevented, and such a steering feeling that the braking force gradually increases in accordance with the elapsed time after the braking start is also realized. In other words, the unstable vehicle behavior is prevented, and an uncomfortable feeling, uneasy feeling, or unpleasant feeling produced in the driver can be suppressed.

Figure 8:
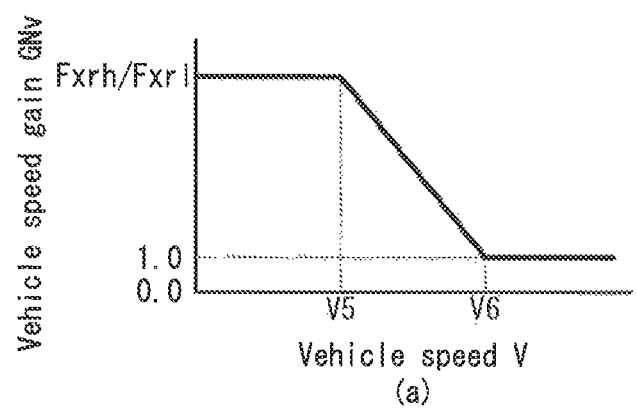
FIG. 8 are views showing another example of the correction gains in the left-right braking force difference reduction processing associated with the rear wheel steering interference compensation control in FIG. 2.
Figure 8:
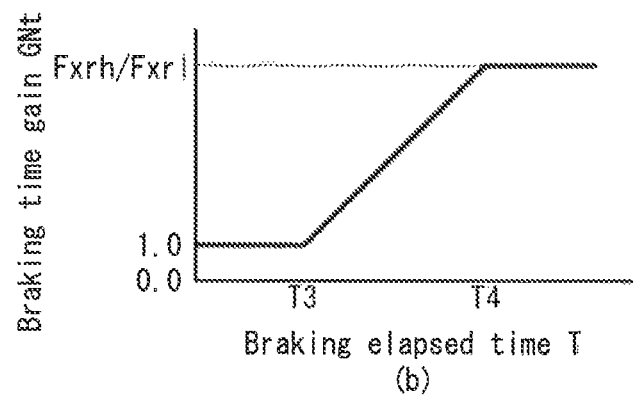

Incidentally, the correction gains in the left-right braking force difference reduction processing are not limited to those in FIG. 7. Now, with reference to FIG. 8, another example of the correction gains in the left-right braking force difference reduction processing will be explained. FIG. 8 are views showing the another example of the correction gains in the left-right braking force difference reduction processing.

Here, if the correction gains in FIG. 8 are used, the following equation (13) is used instead of the above equation (12). Incidentally, in the following equation (13), Fxrl is the braking force of the rear wheel on the low friction coefficient side.

$$Fxrhtg = Fxrl \cdot GNh \cdot (GNv \text{ or } Gnt) \qquad (13)$$

In FIG. 8, FIG. 8(a) shows another example of the vehicle gain GNv, and FIG. 8(b) shows another example of the braking time gain GNt.

FIG. 8(a) is a view showing the characteristic of the vehicle speed gain GNv with respect to the vehicle speed V. As illustrated, the vehicle speed gain GNv is set to "Fxrh/Fxrl" corresponding to practically no correction in a low vehicle speed region of V<V5 which corresponds to that the vehicle speed V is relatively low, and the vehicle speed gain GNv is set to "1" which corresponds to that the braking force of the rear wheel on the high friction coefficient side is a value corresponding to the braking force of the rear wheel on the low friction coefficient side in a high vehicle speed region of V≥V6 which corresponds to that the vehicle speed V is relatively high. Moreover, in a middle region of V5≤V<V6, the vehicle speed gain GNv decreases linearly.

FIG. 8(b) is a view showing the characteristic of the braking time gain GNt with respect to the braking elapsed time T. As illustrated, the braking time gain GNt is set to "1" which corresponds to that the braking force of the rear wheel on the high friction coefficient side is a value corresponding to the braking force of the rear wheel on the low friction coefficient side in a time region of T<T3 which corresponds to that the braking elapsed time T is relatively short, and the braking time gain GNt is set to "Fxrh/Fxrl" corresponding to practically no correction in a time region of T≥T4 which corresponds to that the braking elapsed time T is relatively long. Moreover, in a middle region of T3≤T<T4, the braking time gain GNt increases linearly.

Even in this case, there is no change in that the braking force of the rear wheel on the high friction coefficient side is reduced on the whole, and the effect of the rear wheel left-right braking force difference reduction processing described above is ensured without change.

Incidentally, in the embodiment, in the rear wheel left-wheel braking force difference reduction processing, the rear wheel left-right braking force difference ΔFxr is reduced before the setting of the second target front wheel steering angle δftg2 in the μ-split braking control. As a result, the left-right braking force difference ΔFx is also reduced and the unintended yaw moment of the vehicle is suppressed, and thus, the second target front wheel steering angle δftg2 in the μ-split braking control is reduced as a necessity. Since, however, the left-right braking force difference ΔFx or the rear wheel left-right braking force difference ΔFxr and the second target front wheel steering angle δftg2 have the mutually complementary relation, the second target front wheel steering angle δftg2 which is a direct factor of the control interference may be reduced before the correction to the reduction side of the left-right braking force difference ΔFxr (the correction to the reduction side of the braking force Fxrh of the rear wheel on the high friction coefficient side).

If the second target front wheel steering angle δftg2 is reduced as described above, the steering angle change for suppressing the yaw moment becomes insufficient. Thus, the ECU 100 reduces the left-right braking force difference ΔFx or the rear wheel left-right braking force difference ΔFxr as a necessity. As a result, whichever control is performed first, it is possible to suppress the control interference between the rear wheel steering angle control in the normal region and the rear wheel steering angle control in the μ-split braking control so as not to prevent the stabilization of the vehicle behavior.

The present invention is not limited to the aforementioned embodiment, but various changes may be made, if desired, without departing from the essence or spirit of the invention which can be read from the claims and the entire specification. A vehicle steering control apparatus, which involves such changes, is also intended to be within the technical scope of the present invention.

INDUSTRIAL APPLICABILITY

The present invention can be applied to a vehicle in which the steering angle of the rear wheels can be changed independently of a driver's operation.

DESCRIPTION OF REFERENCE CODES

FL, FR, RL, RR wheel
10 vehicle
11 steering wheel
12 upper steering shaft
13 lower steering shaft
14 steering mechanism
15 steering wheel angle sensor
16 steering torque sensor
17 VGRS rotation angle sensor
18 vehicle speed sensor
19 yaw rate sensor
20 ARS rotation angle sensor
100 ECU
200 VGRS actuator
300 VGRS driving apparatus
400 EPS actuator
500 EPS driving apparatus
600 ARS actuator
700 ARS driving apparatus
800 ECB

The invention claimed is:

1. A vehicle steering control apparatus for controlling a vehicle, the vehicle comprising a rear wheel steering angle varying apparatus capable of changing a steering angle of rear wheels, said vehicle steering control apparatus comprising:
a first setting device for setting a target steering angle of the rear wheels according to a steering wheel operation of a driver, as a first target steering angle;
a second setting device for setting a target steering angle of the rear wheels which does not work with the steering wheel operation by the driver and which is associated with automatic steering accompanied by control of a vehicle state quantity for a target value, as a second target steering angle;
a controlling device for controlling a steering angle of the rear wheels on the basis of the set first and second target steering angles; and
a limiting device for limiting an influence of the first target steering angle on the steering angle of the rear wheels in accordance with a driving condition of the vehicle if the set first and second target steering angles have a mutually anti-phase relation,
said limiting device limiting an influence of the second target steering angle on the steering angle of the rear wheels in accordance with the driving condition of the vehicle in preference to the first target steering angle if the automatic steering suppresses a change in the vehicle state quantity produced in a process of controlling a state controlled variable of the vehicle which is different from the steering angle of the rear wheels.

2. The vehicle steering control apparatus according to claim 1, wherein said limiting device limits the influence of the first or second target steering angle on the steering angle of the rear wheels by correcting the set first or second target steering angle to a reduction side in accordance with at least one of a value corresponding to a steering input by the driver and a vehicle speed as the driving condition.

3. The vehicle steering control apparatus according to claim 1, wherein
the vehicle comprises a braking force varying apparatus capable of changing a braking force applied to each of wheels including the rear wheels as the state controlled variable,
said second setting device sets the second target steering angle such that a yaw moment of the vehicle as the vehicle state quantity which changes to be high or low in accordance with a large or small left-right braking force difference of the wheels, respectively, is canceled out by a yaw moment of the vehicle which changes to be high and low in accordance with the large or small steering angle of the vehicle, respectively, and said limiting device limits the influence of the second target steering angle on the steering angle of the rear wheels by correcting the set second target steering angle to a reduction side in accordance with at least one of a value corresponding to a steering input by the driver and a vehicle speed as the driving condition and by controlling the left-right braking force difference via the braking force varying apparatus so as to suppress a change in the yaw moment of the vehicle due to the correction to the reduction side of the set second target steering angle.

4. The vehicle steering control apparatus according to claim 1, wherein the vehicle comprises a braking force varying apparatus capable of changing a braking force applied to each of wheels including the rear wheels as the state controlled variable, said second setting device sets the second target steering angle such that a yaw moment of the vehicle as the vehicle state quantity which changes to be high or low in accordance with a large or small left-right braking force difference of the wheels, respectively, is canceled out by a yaw moment of the vehicle which changes to be high and low in accordance with the large or small steering angle of the vehicle, respectively, and said limiting device limits the influence of the second target steering angle on the steering angle of the rear wheels by controlling the left-right braking force difference in accordance with at least one of a value corresponding to a steering input by the driver and a vehicle speed as the driving condition via the braking force varying apparatus.

5. The vehicle steering control apparatus according to claim 3, wherein the left-right braking force difference of the wheels is a left-right braking force difference caused by a difference in a friction coefficient if the braking force is applied to the each wheel in cases where the vehicle drives on a road surface with mutually different friction coefficients.

6. The vehicle steering control apparatus according to claim 3, wherein said limiting device reduces a correction amount to the reduction side of a left-right braking/driving force difference of the rear wheels or the set second target steering angle, with increasing elapsed time from start of the application of the braking force.

* * * * *